(12) United States Patent
Keehn

(10) Patent No.: US 9,100,057 B1
(45) Date of Patent: Aug. 4, 2015

(54) RADIO TRANSCEIVER CONTROL AND MONITORING BY A WIRELESS DEVICE

(71) Applicant: The Boeing Company, Chicago, IL (US)

(72) Inventor: Nicholas A. Keehn, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 345 days.

(21) Appl. No.: 13/781,295

(22) Filed: Feb. 28, 2013

(51) Int. Cl.
| | |
|---|---|
| *H04B 7/00* | (2006.01) |
| *H04B 7/005* | (2006.01) |
| *H04W 24/00* | (2009.01) |
| *H04M 3/51* | (2006.01) |
| *H04W 4/10* | (2009.01) |

(52) U.S. Cl.
CPC .............. *H04B 7/005* (2013.01); *H04W 24/00* (2013.01); *H04M 3/51* (2013.01); *H04W 4/10* (2013.01)

(58) Field of Classification Search
CPC ... H04M 3/51; H04M 1/6041; H04M 3/5125; H04M 3/5183; H04M 3/56; H04M 3/58
USPC ......... 455/518, 519, 500, 517, 445, 418–420, 455/569.1, 569.2, 575.1, 502, 416, 403, 455/422.1, 466; 370/259, 261, 262, 328, 370/329, 343, 310
See application file for complete search history.

(56) References Cited

U.S. PATENT DOCUMENTS

2009/0111498 A1* 4/2009 Keppler et al. ............... 455/518

* cited by examiner

*Primary Examiner* — Keith Ferguson
(74) *Attorney, Agent, or Firm* — Toler Law Group, PC

(57) ABSTRACT

A particular device includes a first interface, a second interface, and a wireless interface. The device also includes a processor coupled to the first interface, the second interface, and the wireless interface. The device further includes a memory storing instructions that, when executed by the processor, cause the processor to perform operations including causing a command received from a computing system via the second interface to be sent to a radio transceiver system via the first interface. The operations also include causing an acknowledgement received from the radio transceiver system via the first interface to be sent to the computing system via the second interface. The acknowledgement is responsive to the command. The operations further include causing a message indicating the acknowledgement to be sent to a wireless computing device via the wireless interface.

20 Claims, 7 Drawing Sheets

RADIO TRANSCEIVER CONTROL AND MONITORING BY A WIRELESS DEVICE

FIELD OF THE DISCLOSURE

The present disclosure is generally related to radio transceiver control and monitoring by a wireless device.

BACKGROUND

A radio operator at a control tower of an airport may communicate with ground crew and air crew via a radio transceiver system from a fixed computing system (e.g., a fixed location computer terminal). The communications at the control tower may be time-sensitive. For example, the radio operator may send a command to the radio transceiver system and may expect an acknowledgement in response. The radio operator may perform an additional action (e.g., resending the command or sending another command) based on information received in the acknowledgement. In order to act in a timely manner, the radio operator may maintain substantially constant proximity with the fixed computing system. As a result, the radio operator's freedom of movement may be restricted. For example, if the radio operator wants to step away from the fixed computing system, another radio operator may have to be available to take his place.

SUMMARY

Systems and methods of controlling and monitoring a radio transceiver system using a wireless computing device are disclosed. The disclosed embodiments send acknowledgements received from the radio transceiver system to a wireless computing device. Use of the wireless computing device may allow a radio operator to move away from a fixed computing device without causing communication delays.

For example, the disclosed systems and methods may send an acknowledgement received from the radio transceiver system to the wireless computing device. The acknowledgement may be in response to a command sent to the radio transceiver system by the wireless computing device or sent by another device, such as the fixed computing system. Based on the acknowledgement, the wireless computing device may be able to monitor the radio transceiver system and update a status associated with the radio transceiver system that may include changes that result from a command sent by another device. A radio operator may use the wireless computing device to send a command to the radio transceiver system based on the updated status. Thus, a radio operator may be able use the wireless computing device to monitor and control operations of the radio transceiver system.

In a particular embodiment, a device includes a first interface, a second interface, and a wireless interface. The device also includes a processor coupled to the first interface, the second interface, and the wireless interface. The device further includes a memory storing instructions that, when executed by the processor, cause the processor to perform operations including causing a command received from a computing system via the second interface to be sent to a radio transceiver system via the first interface. The operations also include causing an acknowledgement received from the radio transceiver system via the first interface to be sent to the computing system via the second interface. The acknowledgement is responsive to the command. The operations further include causing a message indicating the acknowledgement to be sent to a wireless computing device via the wireless interface.

In another particular embodiment, a method includes receiving, at a device, a command from a computing system and sending the command from the device to a radio transceiver system. The method also includes receiving, at the device, an acknowledgement responsive to the command from the radio transceiver system and sending the acknowledgement from the device to the computing system. The method further includes sending a message indicating the acknowledgement from the device to a wireless computing device via a wireless interface.

In another embodiment, a computer-readable storage device stores instructions that, when executed by a processor, cause the processor to perform operations including receiving a command from a computing system and sending the command to a radio transceiver system. The operations also include receiving an acknowledgement from the radio transceiver system responsive to the command and sending the acknowledgement to the computing system. The operations further include sending, via a wireless interface, a message indicating the acknowledgement to a wireless computing device.

Thus, particular embodiments send a command received from a computing system to a radio transceiver system and send an acknowledgement received from the radio transceiver to a wireless computing device in addition to the computing system. The wireless computing device may update a status indicating settings of the radio transceiver system based on the acknowledgement. As a result, a radio operator may be able to use the wireless computing device to monitor and control the radio transceiver system.

The features, functions, and advantages that have been described can be achieved independently in various embodiments or may be combined in yet other embodiments, further details of which are disclosed with reference to the following description and drawings.

DETAILED DESCRIPTION

Figure 1:
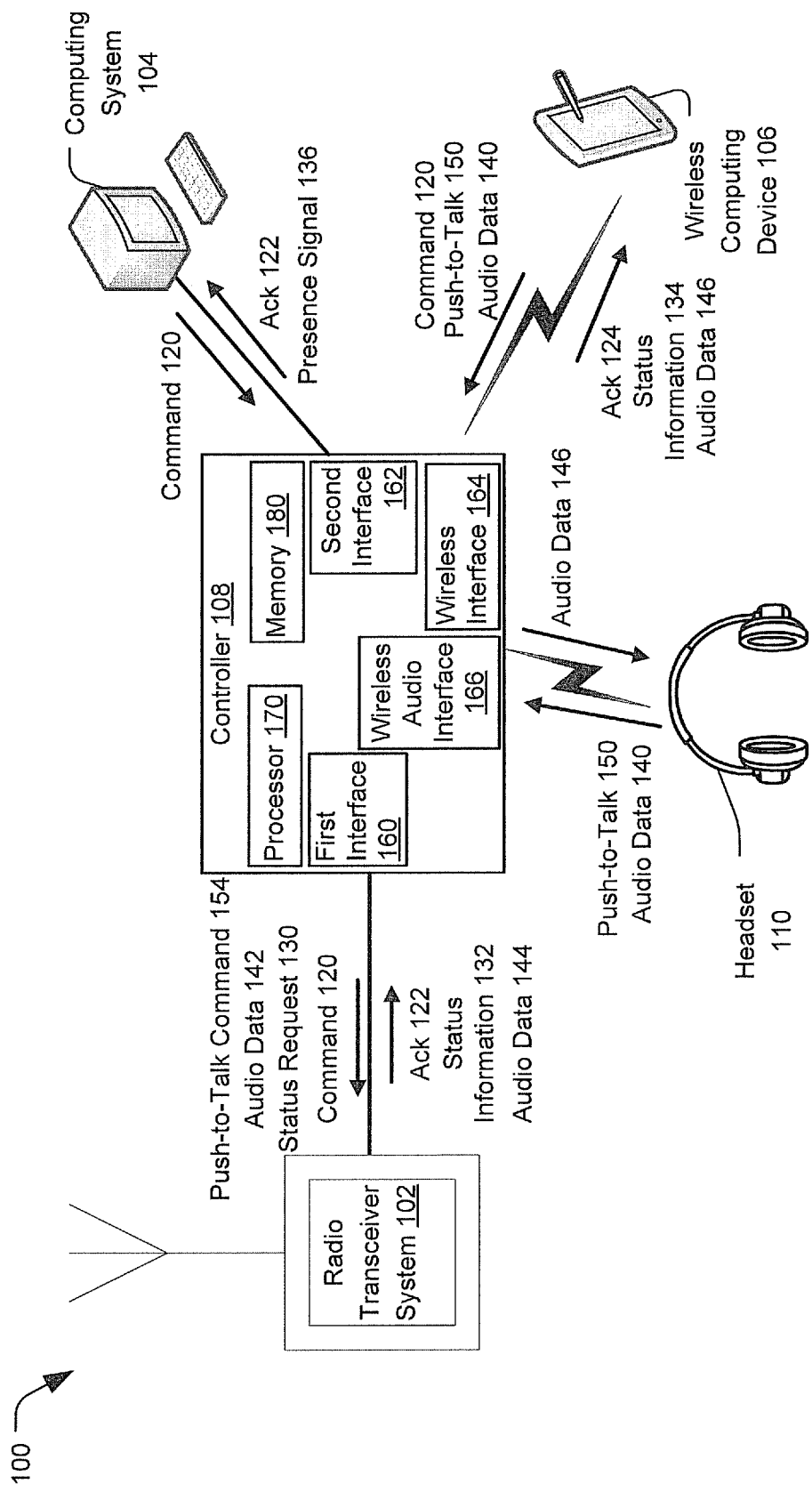
FIG. 1 is a diagram of a particular embodiment of a control system that is operable to control and monitor operations of a radio transceiver system using a wireless computing device.

Referring to FIG. 1, a diagram of a particular embodiment of a control system is disclosed and generally designated 100.

The control system 100 may include a radio transceiver system 102 and a controller 108. The controller 108 may include a first interface 160, a second interface 162, a wireless interface 164, and a wireless audio interface 166.

The controller 108 may be coupled to the radio transceiver system 102 via the first interface 160 and to a computing system 104 via the second interface 162. The controller 108 may be configured to communicate with one or more wireless devices (e.g., a headset 110, a wireless computing device 106, or both) via the wireless interface 164. The controller 108 may also be configured to communicate with the one or more wireless devices via the wireless audio interface 166. The controller 108 may include a processor 170 coupled to a memory 180. The processor 170 may be coupled to the first interface 160, the second interface 162, the wireless interface 164, and the wireless audio interface 166.

The memory 180 may store instructions that are executable by the processor 170 to perform various operations. For example, the processor 170 may perform operations including receiving and processing commands from the computing system 104. The commands may be received via the second interface 162. To illustrate, the computing system 104 may send a command 120 to the controller 108. The processor 170 may also perform operations including initiating sending of a command to the radio transceiver system 102. For example, the processor 170 may cause the first interface 160 to send the command 120 to the radio transceiver system 102 in response to receiving the command 120 from the computing system 104.

After sending the command 120 to the radio transceiver system 102, the controller 108 may receive an acknowledgement message from the radio transceiver system 102. The acknowledgement 122 may indicate that the command 120 was received by the radio transceiver system 102. Alternatively, or in addition, the acknowledgement 122 may indicate whether the radio transceiver system 102 successfully performed the command 120.

Examples of the command 120 include a change frequency command, a change channel command, an adjust side tones command, an adjust feedback command, an adjust squelch command, an activate push-to-talk command, a deactivate push-to-talk command, or a combination thereof. The radio transceiver system 102, in response to receiving the command 120, may take actions such as adjusting operating characteristics of the radio transceiver system 102 based on parameters provided by the command 120. Depending on the specific command sent, the radio transceiver system 102 may also take actions, such as communicating via an antenna to a remote device (e.g. another radio transceiver).

The processor 170 within the controller 108 may process the acknowledgement 122. For example, the processor 170 may initiate sending the acknowledgement 122, via the second interface 162, to the computing system 104. Alternatively, or in addition, the processor 170 may initiate sending a message indicating the acknowledgement 122 to a wireless device. For example, the processor 170 may cause the wireless interface 164 to send an acknowledgement 124 to the wireless computing device 106. For example, the acknowledgement 122 may include information regarding an action taken by the radio transceiver system 102 in response to the command 120. As another example, the acknowledgement 122 may include a state of the radio transceiver system 102 after implementing the command 120 (e.g., a frequency value, a channel value, a side tones value, a feedback value, a squelch value, a push-to-talk activation value, or a combination thereof). The acknowledgement 124 may include information derived from the acknowledgement 122. For example, the acknowledgement 124 may include the information regarding the action taken by the radio transceiver system 102 in response to the command 120. As another example, the acknowledgement 124 may include the state of the radio transceiver system 102 after implementing the command 120. Alternatively or in addition, the controller 108 may send the acknowledgement 124 to another wireless device such as a smart phone or other portable computing device having wireless capability.

The wireless computing device 106 may receive the acknowledgement 124 sent by the controller 108. In response to receiving the acknowledgement 124, the wireless computing device 106 may update a status or other information related to a view of the radio transceiver system 102. For example, the wireless computing device 106 may include software to monitor or control the radio transceiver system 102. The acknowledgement 124 may be processed by the wireless computing device 106 to update a status of the radio transceiver system 102. By communicating the acknowledgement 122 to the computing system 104 and communicating the acknowledgement 124 to the wireless computing device 106, both the computing system 104 and the wireless computing device 106 may maintain an active record and may track, in real time or in near real time, actions occurring at, commands being performed by, or status of the radio transceiver system 102. Thus, the wireless computing device 106 may be synchronized in terms of command and control of the radio transceiver system 102 in a similar manner as the computing system 104. An operator may therefore send commands to and may monitor activities of the radio transceiver system 102 at the computing system 104, at the wireless computing device 106, or both.

In a particular illustrative embodiment, the wireless computing device 106 may include a communications device, a personal digital assistant (PDA), a mobile location data unit, a mobile phone, a cellular phone, a portable computer, a tablet computing device, or a combination thereof. Such devices may include a user interface, e.g., a touch screen, voice recognition capability, or other user interface capabilities, so that an operator may communicate using the wireless computing device 106 to send commands to and receive information from the radio transceiver system 102.

In a particular embodiment, the controller 108 also receives and processes synchronization information. For example, the controller 108 may send a status request 130 to the radio transceiver system 102. The status request 130 may be sent upon detecting a particular event or may be sent periodically. In a particular embodiment, the processor 170 may gather synchronization data and cause the synchronization data to be sent to the wireless computing device 106. The synchronization data may include settings of the radio transceiver system 102. Examples of the settings of the radio transceiver system 102 include frequency information, power level information, channel information, side tones information, feedback information, squelch information, push-to-talk activation information, or a combination thereof. To illustrate, the processor 170 may cause the first interface 160 to send the status request 130 to the radio transceiver system 102. The processor 170 may process status information 132 received in response to the status request 130 from the radio transceiver system 102. The status information 132 may indicate the synchronization data (e.g., the settings of the radio transceiver system 102). In response to receiving the status information 132, the processor 170 may cause status information 134 to be sent to the wireless computing device 106 via the wireless interface 164. The status information 134 may include the synchronization data derived from the status information 132.

In a particular illustrative embodiment, gathering the synchronization data includes emulating a startup process of the computing system 104. For example, during the startup process, the computing system 104 may send a status request message (e.g., the status request 130) to the radio transceiver system 102 and may receive a status message (e.g., the status information 132) responsive to the status request message from the radio transceiver system 102. The status message enables the computing system 104 to determine settings and status of the radio transceiver system 102 when the computing system 104 starts up. After startup, the computing system 104 tracks the status and settings of the radio transceiver system 102 based on commands sent to the radio transceiver system 102 and acknowledgements received.

To emulate the startup process, the controller 108 may send a status request 130 to the radio transceiver system 102 (without receiving the status request 130 from the computing system 104). The radio transceiver system 102 may send the status information 132 but the controller 108 may not forward the status information 132 to the computing system 104. For example, the controller 108 may prevent the status information 132 from being sent to the computing system 104. While emulating the computing system 104, the controller 108 may interrupt communication between the computing system 104 and the radio transceiver system 102. To prevent the computing system 104 from detecting the interruption, the controller 108 may transmit a simulated presence signal (e.g., the presence signal 136) to the computing system 104 during a time period in which data received from the first interface 160 is not passed to the second interface 162. The presence signal 136 may indicate to the computing system 104 that the radio transceiver system 102 is coupled to the computing system 104.

In response to receiving the status message (e.g., the status information 132), the controller 108 may send a message (e.g., the status information 134) indicating information derived from the status message to the wireless computing device 106. The wireless computing device 106 may update a view of the radio transceiver system 102 based on the information (e.g., the status information 134) received from the controller 108. Thus, the wireless computing device 106 may be synchronized with the computing system 104, even in the event that the acknowledgement 124 was missed (e.g., due to a transmission error, loss of wireless communication, etc.).

In a particular embodiment, the controller 108 may be coupled to multiple radio transceiver systems. In this embodiment, a message received or sent by the controller 108 may include an identifier indicating a particular radio transceiver system. For example, the command 120 may include an identifier indicating the particular radio transceiver system (e.g., the radio transceiver system 102) as an intended recipient of the command 120. In response to receiving the command 120, the controller 108 may selectively send the command 120 to the radio transceiver system 102 based on the identifier included in the command 120.

As an additional example, the acknowledgement 124 may include an identifier indicating a particular radio transceiver system (e.g., the radio transceiver system 102) as a sender of the acknowledgement 122. In response to receiving the acknowledgement 124, the wireless computing device 106 may selectively update a status or other information related to a view of the radio transceiver system 102. Similarly, the status information 134 may indicate a particular radio transceiver system (e.g., the radio transceiver system 102) as a sender of the status information 132. In response to receiving the status information 134, the wireless computing device 106 may selectively update a view of the radio transceiver system 102.

In a particular embodiment, the wireless interface 164 is compliant with an industry standard, such as the Institute of Electrical and Electronics Engineers (IEEE) 802.11 standard, a short range radio transmission standard, or other wireless interface standards. In a particular embodiment, the first interface 160 is compliant with an industry standard, such as a serial interface standard. Examples of serial interface standards include Electronic Industries Association (EIA) recommended standard 232 (RS-232) and EIA recommended standard 485 (RS-485). The second interface 162 may be a serial interface compliant with industry standards, such as RS-232 or RS-485. While specific industry standards have been described herein, other standards may be used as well or in the alternative. For example, the wireless interface 164 may be compliant with any wireless standard that accommodates data communication. Similarly, the first interface 160 and the second interface 162 may each be compliant with any data communication interface that accommodates messaging or communication of messages.

In a particular embodiment, the controller 108 may also facilitate audio communication via the headset 110 or the wireless computing device 106. For example, the controller 108 may also receive and process a push-to-talk message. To illustrate, the controller 108 may receive a push-to-talk message 150 from the headset 110 (or from the wireless computing device 106). In response to the push-to-talk message 150, the controller 108 may activate the wireless audio interface 166 to receive audio data 140 from the headset 110 (or from the wireless computing device 106). Additionally, or in the alternative, the controller 108 may send a push-to-talk command 154 to the radio transceiver system 102 in response to receiving the push-to-talk message 150. The push-to-talk command 154 may indicate that push-to-talk capability is to be activated (e.g., that audio data 142 for transmission by the radio transceiver system 102 may follow). The push-to-talk command 154 may alternatively indicate that push-to-talk is to be disabled (e.g., no further audio data 142 for transmission follows at this time).

In a particular embodiment, the controller 108 may receive and process the audio communications. For example, the controller 108 may receive audio data (e.g., the audio data 140) via the wireless audio interface 166 from the headset 110 (or the wireless computing device 106) when the push-to-talk functionality is active. The audio data (e.g., the audio data 140) may be received using a first communication protocol (e.g., an Institute of Electrical and Electronics Engineers (IEEE) 802.11 standard compliant protocol). In response to receiving the audio data (e.g., the audio data 140), the controller 108 may generate second audio data 142 by converting the audio data 140 from the first communication protocol to a second communication protocol (e.g., a wire line protocol, such as a synchronous data link control (SDLC) protocol, a high-level data link control (HDLC) protocol, a digital data communications message protocol (DDCMP), or an International Telecommunication Union Telecommunication Standardization Sector (ITU-T) standard protocol (e.g., X.25)). The controller 108 may transmit the second audio data 142 using the second communication protocol via the first interface 160 to the radio transceiver system 102.

The controller 108 may also receive audio data (e.g., third audio data 144), via the first interface 160, from the radio transceiver system 102. The audio data (e.g., the third audio data 144) received from the radio transceiver system 102 may use the second communication protocol. In response to receiving the third audio data 144 from the radio transceiver system 102, the controller 108 may convert the third audio data 144 from the second communication protocol to the first communication protocol and transmit the audio data (e.g., fourth audio data 146) to the headset 110 (or to the wireless computing device 106).

In a particular embodiment, the controller 108 may be coupled to multiple radio transceiver systems. In this embodiment, a message received or sent by the controller 108 may include an identifier indicating a particular radio transceiver system (e.g., the radio transceiver system 102). For example, the push-to-talk message 150 may include an identifier indicating that the push-to-talk functionality is to be enabled or disabled at the radio transceiver system 102. In response to receiving the push-to-talk message 150, the controller 108 may selectively send a push-to-talk command 154 to the radio transceiver system 102. In a particular embodiment, the controller 108 may send a push-to-talk command 154 to another radio transceiver system in addition to sending a push-to-talk command 154 to the particular radio transceiver system (e.g., the radio transceiver system 102). For example, the push-to-talk command 154 sent to radio transceiver system 102 may indicate that the push-to-talk functionality is to be enabled, and the push-to-talk command 154 sent to the other radio transceiver system may indicate that the push-to-talk functionality is to be disabled. In a particular embodiment, the push-to-talk message 150 may indicate multiple radio transceiver systems at which push-to-talk functionality is to be enabled or disabled. The controller 108 may send the push-to-talk command 154 to the multiple radio transceiver systems indicated in the push-to-talk message 150. In a particular embodiment, the controller 108 may send the push-to-talk command 154 to all radio transceiver systems that are coupled to the controller 108.

Thus, the control system 100 may enable monitoring and control of the radio transceiver system 102 by the wireless computing device 106. The wireless computing device 106 may be kept synchronized with the computing system 104 via status updates from the radio transceiver system 102. In addition, audio communications may be enabled between the radio transceiver system 102 and the headset 110 (or the wireless computing device 106).

Figure 2:
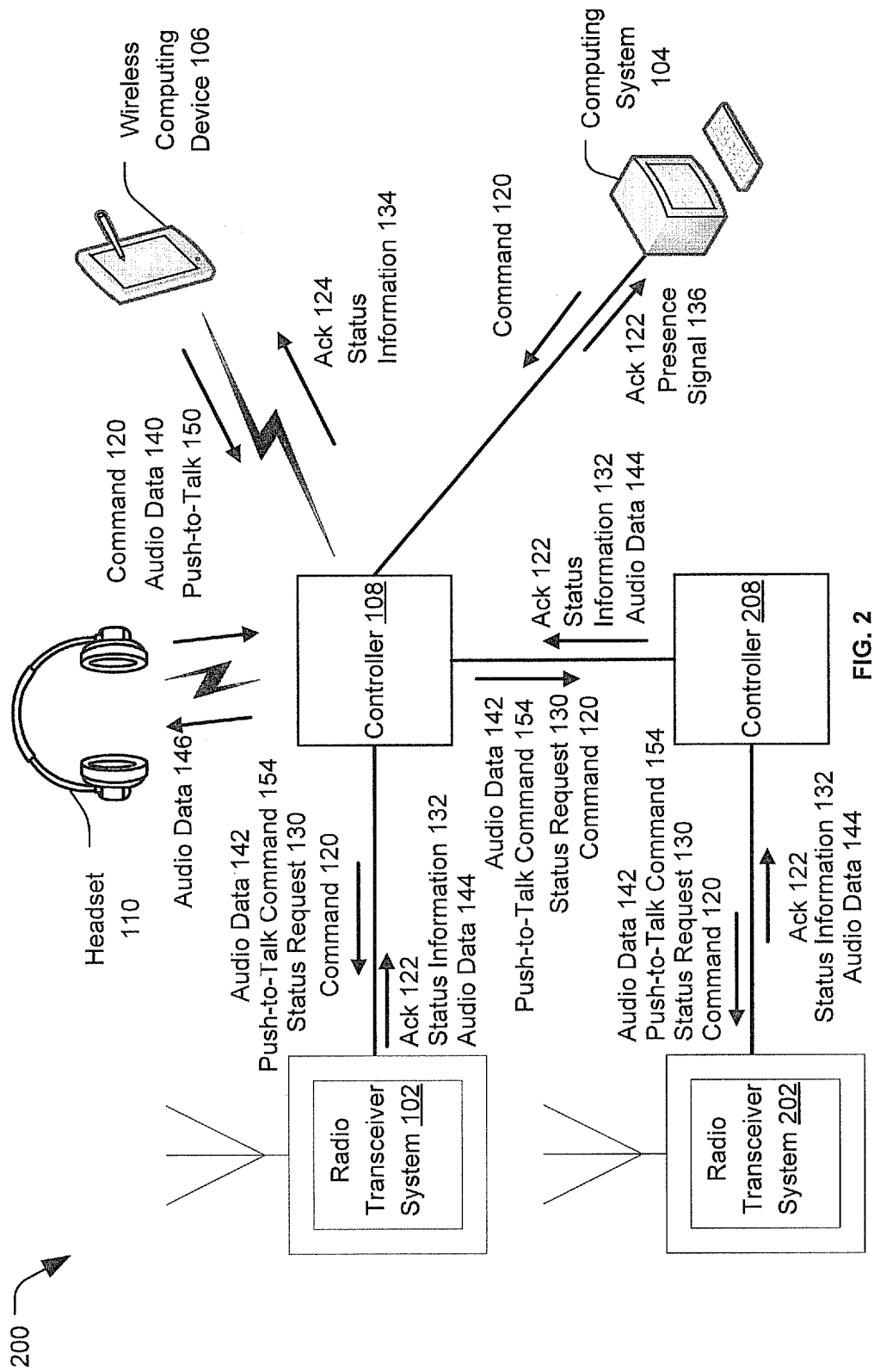
FIG. 2 is a diagram of a particular embodiment of a control system that is operable to control and monitor operations of multiple radio transceiver systems using a wireless computing device.

Referring to FIG. 2, a diagram of a particular embodiment of a control system is disclosed and generally designated 200. The control system 200 may include the radio transceiver system 102 of FIG. 1, the controller 108 of FIG. 1, and a controller 208.

The controller 108 may be coupled to the radio transceiver system 102 and to the computing system 104. The controller 108 may be configured to communicate with one or more wireless devices (e.g., the headset 110, the wireless computing device 106, or both). In a particular embodiment, the controller 108 may be a master controller and may be coupled to one or more slave controllers (e.g., the controller 208). The one or more slave controllers may be coupled to one or more other radio transceiver systems (e.g., a radio transceiver system 202). In a particular embodiment, one or more wireless interfaces of the master controller may be enabled, and one or more wireless interfaces of the one or more slave controllers may be disabled. For example, the wireless audio interface 166 and/or the wireless interface 164 of the controller 108 may be enabled and a wireless interface (e.g., an audio interface, a data interface, or both) of the controller 208 may be disabled.

The controller 108 may enable monitoring and control of the radio transceiver system 102 and of the one or more other radio transceiver systems by the wireless computing device 106. For example, the computing system 104 may send a command 120 to the controller 108. The controller 108 may determine that the command 120 is intended for the radio transceiver system 102 and may send the command 120 to the radio transceiver system 102. Alternatively, the controller 108 may determine that the command 120 is intended for the radio transceiver system 202 (e.g., based on an identifier included in the command 120). The controller 108 may send the command 120 to the radio transceiver system 202 via the slave controller (e.g., the controller 208) associated with the radio transceiver system 202. In a particular embodiment, the controller 108 may send the command 120 via a bus interface coupled to multiple slave controllers including the controller 208.

In response to receiving the command 120, a slave controller (e.g., the controller 208) may selectively forward the command 120 to a radio transceiver system (e.g., the radio transceiver system 202) associated with the slave controller based on determining that the command 120 indicates the associated radio transceiver system (e.g., the radio transceiver system 202).

The controller 208 may receive an acknowledgement 122 from the radio transceiver system 202 and forward the acknowledgement to the master controller (e.g., the controller 108). The controller 108 may send the acknowledgement 124 to the wireless computing device 106. The acknowledgement 124 may include information of the acknowledgement 122. The wireless computing device 106 may update a view associated with the radio transceiver system 202 in response to the acknowledgement 124, e.g., based on the acknowledgement 124 including an identifier of the radio transceiver system 202.

The controller 108 may receive synchronization information from the radio transceiver system 102, as explained with reference to FIG. 1. Alternatively, or in addition, the controller 108 may receive synchronization information from one or more other radio transceiver systems (e.g., the radio transceiver system 202) via the one or more slave controllers (e.g., the controller 208). For example, the controller 108 may send a status request 130 to the radio transceiver system 202 via the controller 208. The controller 208 (e.g., a slave controller) may receive status information 132 from the radio transceiver system 202 responsive to the status request 130. The controller 208 may forward the status information 132 to the controller 108 (e.g., the master controller). The controller 108 may send status information 134 to the wireless computing device 106. The status information 134 may indicate information included in the status information 132. The wireless computing device 106 may update a view associated with the radio transceiver system 202 in response to the status information 134, e.g., based on the status information 134 including an identifier of the radio transceiver system 202.

In a particular embodiment, the controller 108 may enable audio communication between the radio transceiver systems (e.g., the radio transceiver system 102, the radio transceiver system 202, or both) and the headset 110. For example, the controller 108 may receive a push-to-talk message 150 from the headset 110 (or from the wireless computing device 106) indicating that push-to-talk functionality is to be enabled or disabled at a particular radio transceiver system (e.g., the radio transceiver system 102 or the radio transceiver system 202). In response to the push-to-talk message 150, the controller 108 may activate the wireless audio interface 166 to receive audio data 140 from the headset 110 (or from the wireless computing device 106).

Additionally, or in the alternative, the controller 108 may send a push-to-talk command 154 to the particular radio transceiver system in response to receiving the push-to-talk message 150. For example, the controller 108 may send the push-to-talk command 154 to the radio transceiver system 102, as explained with reference to FIG. 1. Alternatively, the controller 108 may send a push-to-talk command 154 to the radio transceiver system 202 via the controller 208. The push-to-talk command 154 may indicate that push-to-talk capability is to be activated. The push-to-talk command 154 may alternatively indicate that push-to-talk functionality is to be disabled.

In a particular embodiment, the controller 108 may receive and process the audio communications. For example, the controller 108 may receive audio data (e.g., the audio data 140) via the wireless audio interface 166 from the headset 110 (or the wireless computing device 106) when the push-to-talk functionality is active. The controller 108 may determine that the audio data is intended for a particular radio transceiver system (e.g., based on a previously received push-to-talk message 150). In response to determining that the particular radio transceiver system (e.g., the radio transceiver system 102) is associated with the controller 108, the controller 108 may forward the audio data to the particular radio transceiver system (e.g., the radio transceiver system 102), as described with reference to FIG. 1. In response to determining that the particular radio transceiver system (e.g., the radio transceiver system 202) is associated with a slave controller (e.g., the controller 208), the controller 108 may forward the audio data (e.g., the audio data 140) to the slave controller (e.g., the controller 208). In response to receiving the audio data (e.g., the audio data 140), the controller 208 may generate second audio data 142 by converting the audio data 140 from a first communication protocol to a second communication protocol. The controller 208 may transmit the second audio data 142 using the second communication protocol to the radio transceiver system 202.

The controller 208 may also receive audio data (e.g., third audio data 144) from the radio transceiver system 202. The audio data (e.g., the third audio data 144) received from the radio transceiver system 202 may use the second communication protocol. In response to receiving the third audio data 144 from the radio transceiver system 202, the controller 208 may forward the third audio data 144 to the controller 108 (e.g., the master controller). The controller 108 may convert the third audio data 144 from the second communication protocol to the first communication protocol and transmit the audio data (e.g., fourth audio data 146) to the headset 110 (or to the wireless computing device 106).

In a particular embodiment, in response to receiving the push-to-talk message 150, the controller 108 may send a push-to-talk command 154 to another radio transceiver system in addition to sending a push-to-talk command 154 to a particular radio transceiver system. The push-to-talk command 154 sent to the particular radio transceiver system may indicate that the push-to-talk functionality is to be enabled at the particular radio transceiver system, and the push-to-talk command 154 sent to the other radio transceiver system may indicate that the push-to-talk functionality is to be disabled at the other radio transceiver system. For example, the push-to-talk message 150 may indicate that push-to-talk functionality is to be enabled at the radio transceiver system 202. The controller 108 may send the push-to-talk command 154 via the controller 208 to the radio transceiver system 202 indicating that push-to-talk functionality is to be enabled at the radio transceiver system 202 and may send another push-to-talk command 154 to the radio transceiver system 102 indicating that push-to-talk functionality is to be disabled at the radio transceiver system 102. In a particular embodiment, the push-to-talk message 150 may indicate multiple radio transceiver systems at which push-to-talk functionality is to be enabled or disabled. The controller 108 may send the push-to-talk command 154 to the radio transceiver systems indicated in the push-to-talk message 150. In a particular embodiment, the controller 108 may send the push-to-talk command 154 to all radio transceiver systems that are coupled, directly or via slave controllers, to the controller 108.

Thus, the control system 200 may enable monitoring and control of multiple radio transceiver systems (e.g., the radio transceiver system 102 and the radio transceiver system 202) by the wireless computing device 106. The wireless computing device 106 may be kept synchronized with the computing system 104 via status updates from the radio transceiver system 102 and via status updates from the radio transceiver system 202. In addition, audio communications may be enabled between the radio transceiver system 102 and the headset 110 (or the wireless computing device 106) and between the radio transceiver system 202 and the headset 110 (or the wireless computing device 106).

Figure 3:
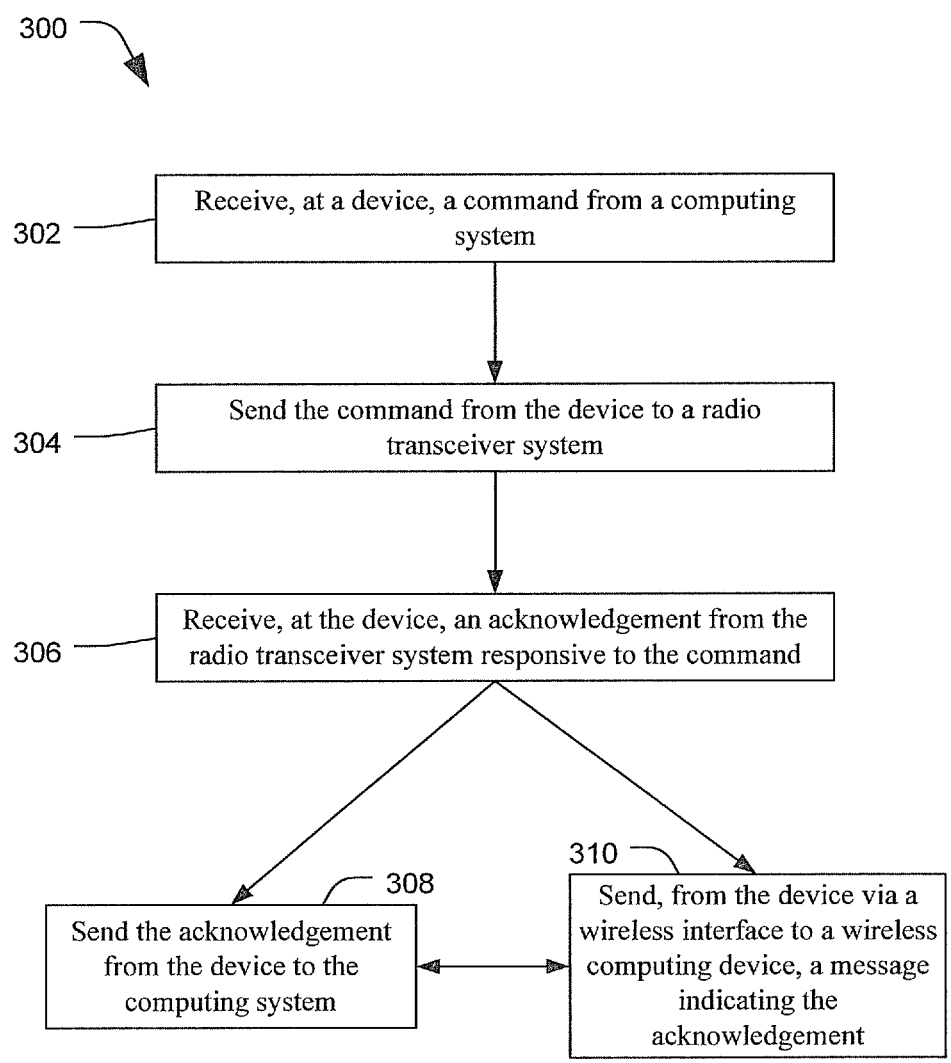
FIG. 3 is a flow chart illustrating a particular embodiment of a method of controlling and monitoring operations of a radio transceiver system using a wireless computing device.

Referring to FIG. 3 a flow chart of a particular illustrative embodiment of a method of controlling operations of a radio transceiver system is shown and is generally designated 300. The method 300 of FIG. 3 may be executed by a control system, such as the control system 100 of FIG. 1, the control system 200 of FIG. 1, or both.

The method 300 may include receiving, at a device, a command from a computing system, at 302. For example, the controller 108 of FIG. 1 may receive the command 120 from the computing system 104. The method 300 may also include sending the command from the device to a radio transceiver system, at 304. For example, the controller 108 of FIG. 1 may send the command 120 to the radio transceiver system 102.

The method 300 may further include receiving, at the device, an acknowledgement from the radio transceiver system responsive to the command, at 306. For example, the controller 108 of FIG. 1 may receive the acknowledgement 122 from the radio transceiver system 102. The radio transceiver system 102 may send the acknowledgement 122 to the controller 108 in response to receiving the command 120. The method 300 may also include sending the acknowledgement from the device to the computing system, at 308. For example, the controller 108 of FIG. 1 may send the acknowledgement 122 to the computing system 104. The method 300 may further include sending, from the device via a wireless interface to a wireless computing device, a message indicating the acknowledgement, at 310. For example, the controller 108 of FIG. 1 may send the acknowledgement 124 to the wireless computing device 106. The acknowledgement 124 may indicate the acknowledgement 122 (e.g., may include information derived from the acknowledgement 122).

Thus, the method 300 may be used to send an acknowledgement received from a radio transceiver system to a wireless computing device. The acknowledgement may be responsive to a command sent to the radio transceiver system from another computing device. Sending the acknowledgement to the wireless computing device may enable the wireless computing device to monitor and control the radio transceiver system. For example, a status of settings at the radio transceiver may be updated at the wireless computing device in response to the acknowledgement.

Figure 4:
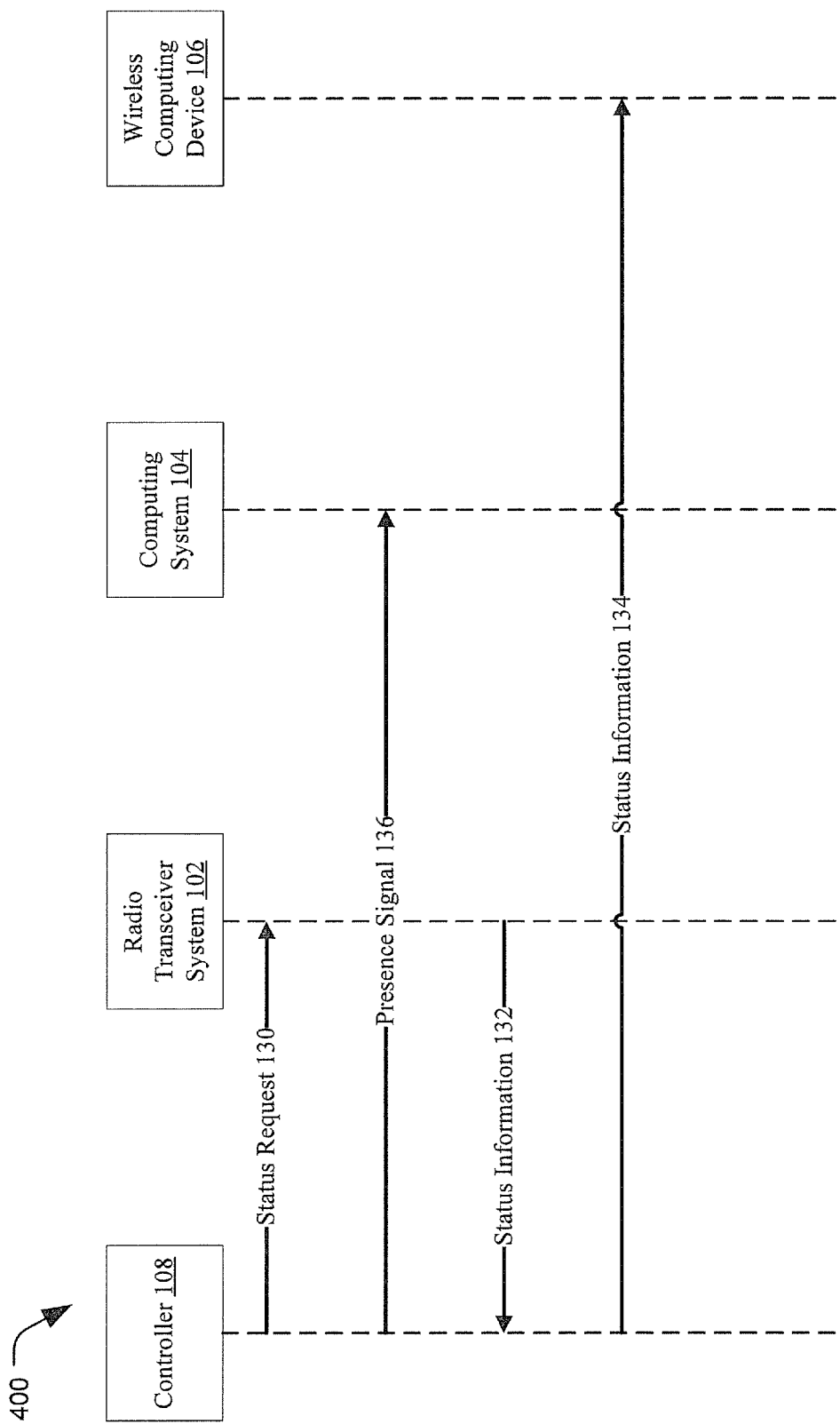
FIG. 4 is a ladder diagram of a particular illustrative embodiment of a method of controlling and monitoring a radio transceiver system using a wireless computing device.

Referring to FIG. 4, a ladder diagram illustrating a particular embodiment of a method of controlling and monitoring a radio transceiver system using a wireless computing device is shown and is generally designated 400. In particular, the ladder diagram of FIG. 4 illustrates interactions among the controller 108, the radio transceiver system 102, the computing system 104, and the wireless computing device 106 of FIG. 1.

The method 400 may include the controller 108 emulating a startup process of the computing system 104 to send updated information related to status and settings of the radio transceiver system 102 to the wireless computing device 106. For example, the method 400 may include sending the status request 130 from the controller 108 to the radio transceiver system 102. The status request 130 may emulate a request sent from the computing system 104 to receive updated information during a startup process of the computing system 104. The status request 130 may request information regarding status and settings of the radio transceiver system 102. Examples of the requested information may include frequency information, power level information, channel information, side tones information, feedback information, squelch information, push-to-talk activation information, or a combination thereof.

The method 400 may also include sending the presence signal 136 from the controller 108 to the computing system 104. The presence signal 136 may indicate to the computing system 104 that the computing system 104 is coupled to the radio transceiver system 102. In a particular embodiment, communication between the computing system 104 and the radio transceiver system 102 may be interrupted while the controller 108 emulates the computing system 104 to forward updated information received from the radio transceiver system 102 to the wireless computing device 106. The controller 108 may send the presence signal 136 to the computing system 104 while communication between the computing system 104 and the radio transceiver system 102 is interrupted by the controller 108.

The method 400 may further include receiving the status information 132 by the controller 108 from the radio transceiver system 102. The radio transceiver system 102 may send the status information 132 to the controller 108 in response to receiving the status request 130. The controller 108 may not forward content of the status information 132 to the computing system 104 because the computing system 104 did not request the status information 132. The controller 108 may send the presence signal 136 to the computing system 104 while data received from the radio transceiver system 102 is not being sent to the computing system 104. The presence signal 136 may indicate to the computing system 104 that the computing system 104 is coupled to the radio transceiver system 102. The presence signal 136 may be a signal that is sent substantially continuously to the computing system 104 during a first time period or may include a plurality of intermittent signals that are sent to the computing system 104 during the first time period. The first time period may begin before, at the same time, or after the controller 108 sends the status request 130 to the radio transceiver system 102. In a particular embodiment, the first time period may begin in response to the controller 108 receiving the status information 132 from the radio transceiver system 102. The first time period may end after a predetermined duration, after sending the status information 134 to the wireless computing device 106, or a combination thereof.

In response to receiving the status information 132, the method 400 may also include sending the status information 134 from the controller 108 to the wireless computing device 106. The status information 134 may include information derived from the status information 132. Examples of the status information 134 include frequency information, power level information, channel information, side tones information, feedback information, squelch information, push-to-talk activation information, or a combination thereof. The wireless computing device 106 may update a view (e.g., a display of a user interface at the wireless computing device 106) regarding the radio transceiver system 102 based on the status information 134. For example, the wireless computing device 106 may determine a frequency setting at the radio transceiver system 102 based on the frequency information, a power level setting at the radio transceiver system 102 based on the power level information, a channel setting at the radio transceiver system 102 based on the channel information, a side tones setting at the radio transceiver system 102 based on the side tones information, a feedback setting at the radio transceiver system 102 based on the feedback information, a squelch setting at the radio transceiver system based on the squelch information, whether push-to-talk is activated based on the push-to-talk activation information, or a combination thereof.

Thus, the method 400 may enable the wireless computing device 106 to be synchronized with status information from the radio transceiver system 102. For example, the wireless computing device 106 may not receive the acknowledgement 124 as a result of lost or interrupted wireless communication. The method 400 may enable the wireless computing device 106 to avoid having out-of-date information or to correct out-of-date information regarding the radio transceiver system 102.

Figure 5:
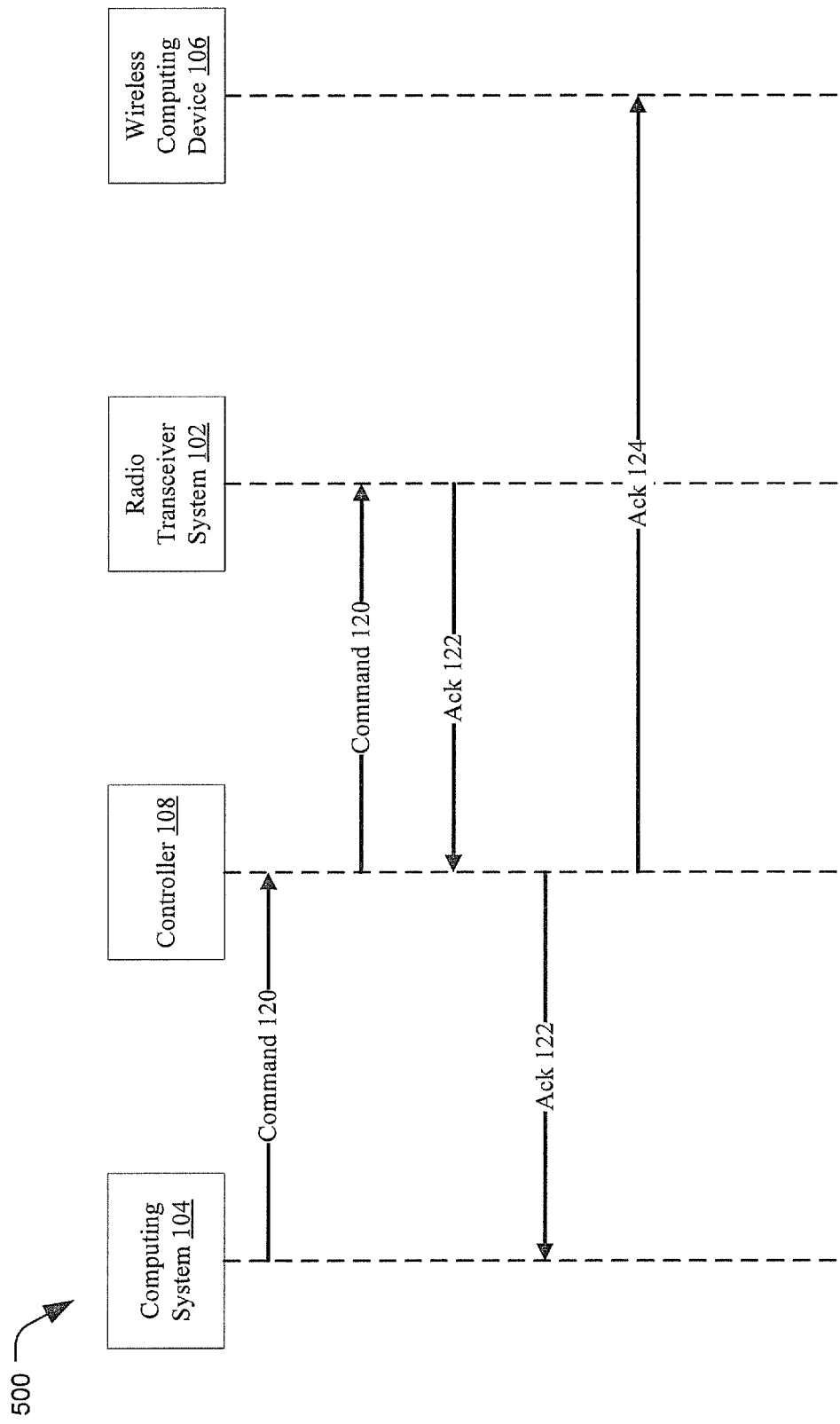
FIG. 5 is a ladder diagram of a particular illustrative embodiment of a method of controlling and monitoring a radio transceiver system using a wireless computing device.

Referring to FIG. 5, a ladder diagram illustrating a particular embodiment of a method of controlling and monitoring a radio transceiver system using a wireless computing device is shown and is generally designated 500. In particular, the ladder diagram of FIG. 5 illustrates interactions among the controller 108, the radio transceiver system 102, the computing system 104, and the wireless computing device 106 of FIG. 1.

The method 500 illustrates the controller 108 forwarding acknowledgements received from the radio transceiver system 102 to the wireless computing device 106 to enable the wireless computing device 106 to monitor and control the radio transceiver system 102. The method 500 may include receiving the command 120 by the controller 108 from the computing system 104. For example, the command 120 may include a change frequency command, a change channel command, an adjust side tones command, an adjust feedback command, an adjust squelch command, an activate push-to-talk command, a deactivate push-to-talk command, or a combination thereof. The method 500 may also include sending the command 120 from the controller 108 to the radio transceiver system 102. For example, the controller 108 may send the command 120 to the radio transceiver system 102 in response to receiving the command 120 from the computing system 104.

The method 500 may further include receiving the acknowledgement 122 by the controller 108 from the radio transceiver system 102. For example, the radio transceiver system 102 may send the acknowledgement 122 to the controller 108 in response to receiving the command 120. Examples of content of the acknowledgement 122 include whether the command 120 was received, whether the command 120 was successfully executed, an error code indicating an error that resulted from attempting to execute the command 120, a change in a setting of the radio transceiver system 102, a change in a status of the radio transceiver system 102, a change in a parameter of the radio transceiver system 102, a frequency value, a channel value, a side tones value, a feedback value, a squelch value, a push-to-talk activation value, or a combination thereof.

The method 500 may include sending the acknowledgement 122 from the controller 108 to the computing system 104. For example, the controller 108 may send the acknowledgement 122 to the computing system 104 in response to receiving the acknowledgement 122 from the radio transceiver system 102.

The method 500 may further include sending the acknowledgement 124 from the controller 108 to the wireless computing device 106. For example, the controller 108 may send the acknowledgement 124 to the wireless computing device 106 in response to receiving the acknowledgement 122 from the radio transceiver system 102. The acknowledgement 124 may indicate the acknowledgement 122. For example, the acknowledgement 124 may include information derived from the acknowledgement 122. The wireless computing device 106 may update a view (e.g., a user interface of the wireless computing device 106) associated with the radio transceiver system 102 based on the acknowledgement 124. For example, the wireless computing device 106 may update information to reflect a status and settings of the radio transceiver system 102. Thus, the wireless computing device 106 may enable monitoring and control of the radio transceiver system 102. For example, a radio operator may monitor the settings and status of the radio transceiver system 102 at the wireless computing device 106. As an additional example, the radio operator may send one or more commands to the radio transceiver system 102 from the wireless computing device 106 in response to monitoring the radio transceiver system 102.

Figure 6:
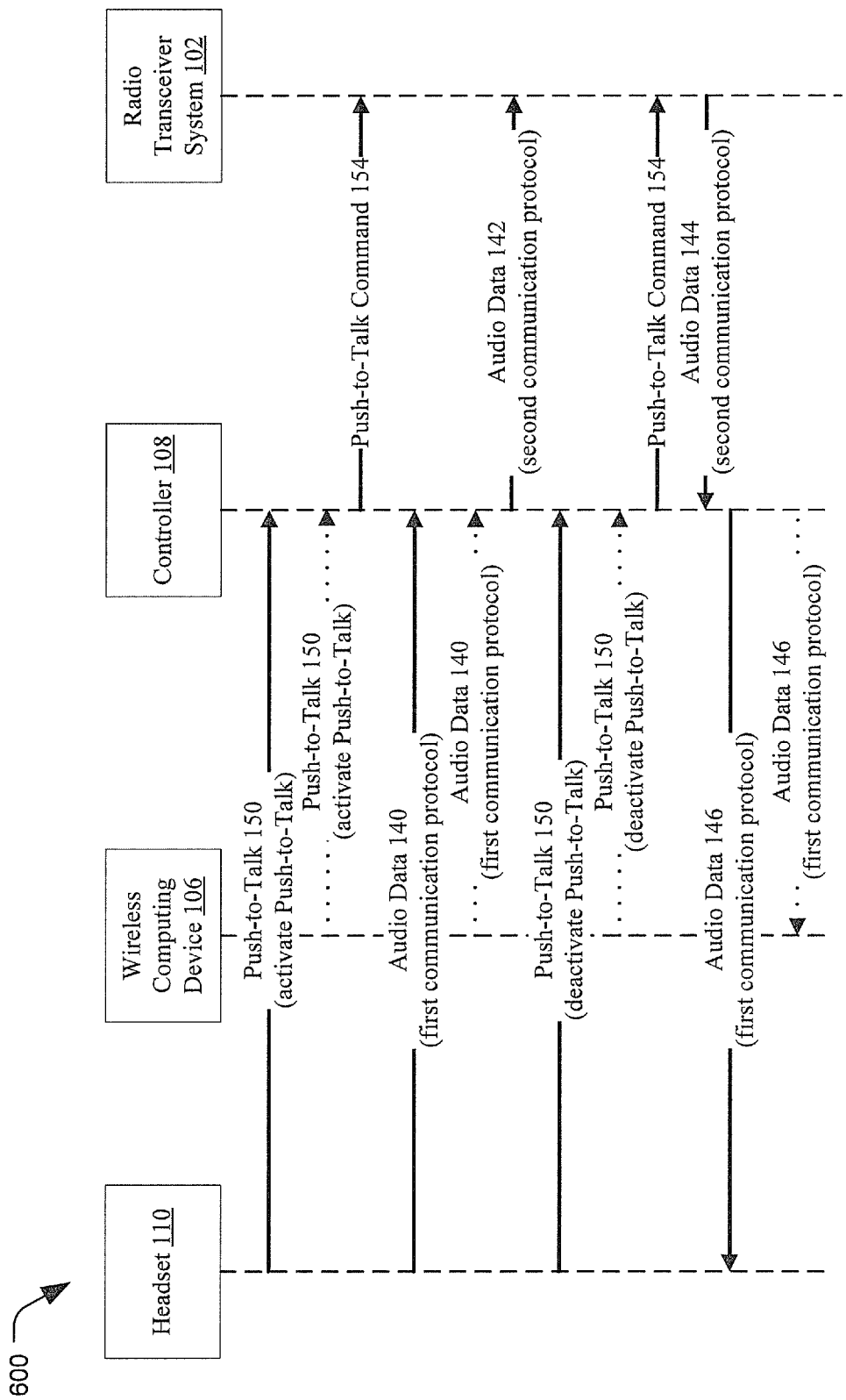
FIG. 6 is a ladder diagram of a particular illustrative embodiment of a method of controlling and monitoring a radio transceiver system using a wireless computing device.

Referring to FIG. 6, a ladder diagram illustrating a particular embodiment of a method of controlling and monitoring a radio transceiver system using a wireless computing device is shown and is generally designated 600. In particular, the ladder diagram of FIG. 6 illustrates interactions among the controller 108, the radio transceiver system 102, the headset 110, and the wireless computing device 106 of FIG. 1.

The method 600 illustrates the controller 108 enabling audio communication between the radio transceiver system 102 and the wireless computing device 106, the headset 110, or both. For example, the method 600 may include receiving a push-to-talk message (e.g., the push-to-talk message 150) by the controller 108 from the headset 110 (or from the wireless computing device 106). The controller 108 may receive the push-to-talk message 150 via the wireless interface 164. In a particular embodiment, the headset 110 (or the wireless computing device 106) may send the push-to-talk message 150 in response to a user input (e.g., indicating activation of a push-to-talk button) to activate push-to-talk functionality.

The method 600 may also include sending a push-to-talk command 154 from the controller 108 to the radio transceiver system 102. For example, the controller 108 may send the push-to-talk command 154 via the first interface 160 to the radio transceiver system 102 in response to receiving the push-to-talk message 150. In a particular embodiment, the controller 108 may activate the wireless audio interface 166 in response to receiving the push-to-talk message 150.

The method 600 may further include receiving audio data 140 by the controller 108 from the headset 110 (or the wireless computing device 106). The audio data 140 may use a first communication protocol (e.g., an Institute of Electrical and Electronics Engineers (IEEE) 802.11 standard compliant protocol). The controller 108 may generate the second audio data 142 by converting the audio data 140 from the first communication protocol to a second communication protocol (e.g., a wire line protocol, such as a synchronous data link control (SDLC) protocol, a high-level data link control (HDLC) protocol, a digital data communications message protocol (DDCMP), or an International Telecommunication Union Telecommunication Standardization Sector (ITU-T) standard protocol (e.g., X.25)). The controller may send the second audio data 142 to the radio transceiver system 102. The second audio data 142 may use the second communication protocol.

The method 600 may also include the controller 108 receiving another push-to-talk message (e.g., the push-to-talk message 150) from the headset 110 (or from the wireless computing device 106) indicating that the push-to-talk functionality is to be deactivated. In a particular embodiment, the headset 110 (or the wireless computing device 106) may send the push-to-talk message 150 in response to a user input (e.g., indicating deactivation of the push-to-talk button) to deactivate push-to-talk functionality. The method 600 may further include sending a push-to-talk command 154 from the controller 108 to the radio transceiver system 102 to deactivate push-to-talk functionality in response to receiving the push-to-talk message 150. In a particular embodiment, the controller 108 may deactivate the wireless audio interface 166 in response to receiving the push-to-talk message 150.

The method 600 may further include the controller 108 receiving the third audio data 144 from the radio transceiver system 102. The third audio data 144 may use the second communication protocol. The controller 108 may generate the fourth audio data 146 by converting the third audio data 144 from the second communication protocol to the first communication protocol. The method 600 may also include the controller 108 sending the fourth audio data 146 to the headset 110 (or to the wireless computing device 106). The fourth audio data 146 may use the first communication protocol.

Thus, the method 600 may enable activation or deactivation of push-to-talk functionality from the wireless computing device 106, the headset 110, or both. For example, activation of the push-to-talk functionality may enable audio communication with the radio transceiver system 102 and deactivation of the push-to-talk functionality may disable audio communication from the headset 110 or the wireless computing device 106 to the radio transceiver system 102.

Figure 7:
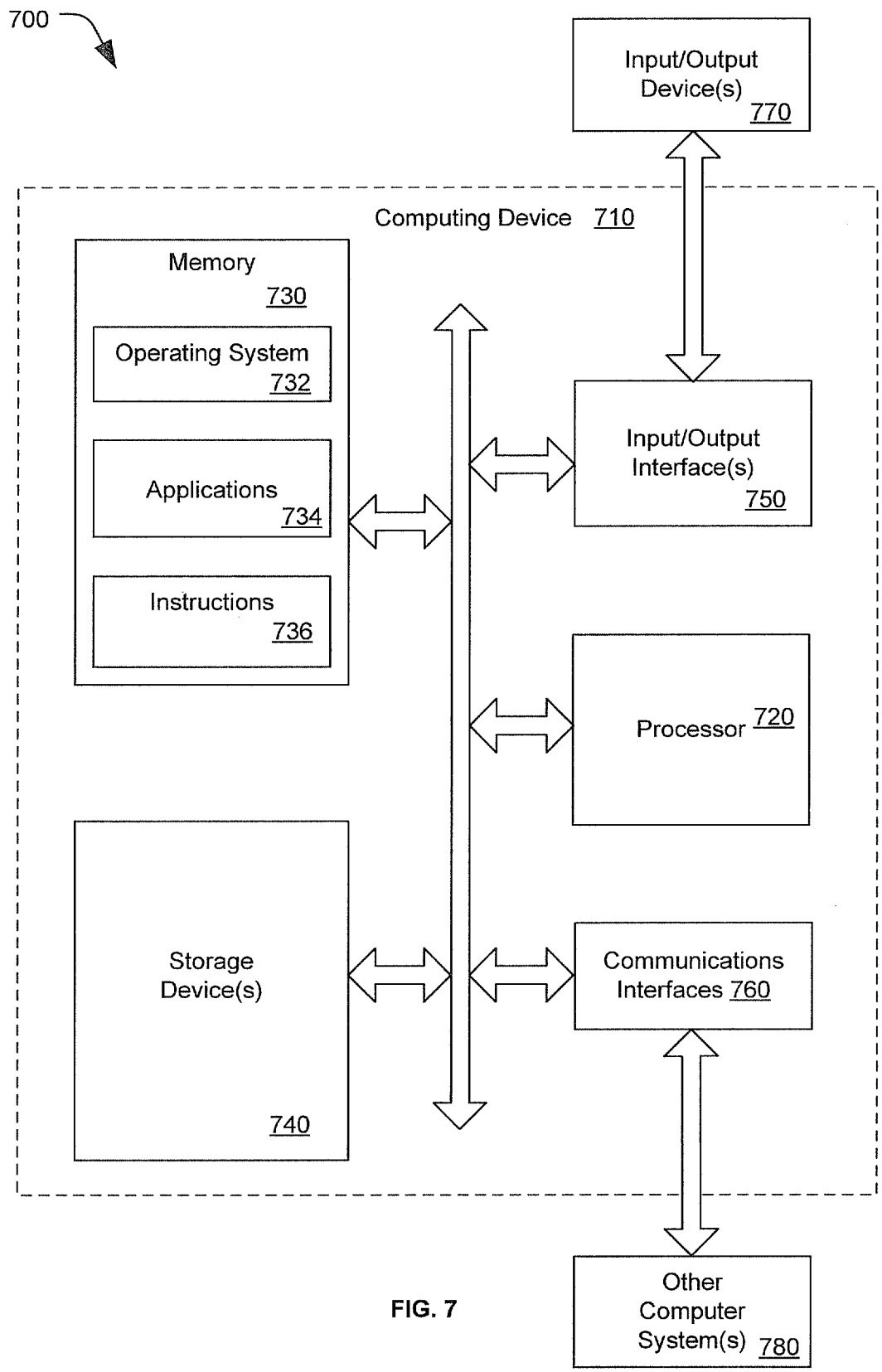
FIG. 7 is a block diagram of a particular illustrative embodiment of a computing environment operable to control and monitor operations of a radio transceiver system using a wireless computing device.

FIG. 7 is a block diagram of a computing environment 700 including a general purpose computing device 710 operable to support embodiments of computer-implemented methods and computer-executable program instructions (or code) according to the present disclosure. For example, the computing device 710, or portions thereof, may be operable to control operations of a radio transceiver system. In another example, the computing device 710, or portions thereof, may be operable to receive a command from a computing system, to send the command to a radio transceiver system, to receive an acknowledgement from the radio transceiver system responsive to the command, to send the acknowledgement to the computing system, and to send a message indicating the acknowledgement via a wireless interface to a wireless computing device. In a particular embodiment, the computing device 710 may include, be included with, or correspond to the controller 108 of FIG. 1. In another particular embodiment, the computing device 710 may include, be included with, or correspond to the controller 208 of FIG. 1. In another example, the computing device 710, or portions thereof, may be operable to receive an acknowledgement from a controller, to send a command to the controller, to send a push-to-talk message to the controller, to send audio data to the controller, to receive audio data from the controller, and to receive status information from the controller. In a particular embodiment, the computing device 710 may include, be included with, or correspond to the wireless computing device 106 of FIG. 1.

The computing device 710 may include a processor 720. In a particular embodiment, the processor 720 may correspond to the processor 170 of FIG. 1. In another particular embodiment, the processor 720 may correspond to a processor of the controller 208. In another particular embodiment, the processor 720 may correspond to a processor of the wireless computing device 106. Within the computing device 710, the processor 720 may communicate with memory 730, one or more storage devices 740, one or more input/output interfaces 750, one or more communications interfaces 760, or a combination thereof.

The memory 730 may include volatile memory devices (e.g., random access memory (RAM) devices), nonvolatile memory devices (e.g., read-only memory (ROM) devices, programmable read-only memory, and flash memory), or both. The memory 730 may include an operating system 732, which may include a basic/input output system for booting the computing device 710 as well as a full operating system to enable the computing device 710 to interact with users, other programs, and other devices. In a particular embodiment, the memory 730 may correspond to the memory 180 of FIG. 1. In another particular embodiment, the memory 730 may correspond to a memory of the controller 208 of FIG. 2. In another particular embodiment, the memory 730 may correspond to a memory of the wireless computing device 106 of FIG. 1. The memory 730 may include one or more application programs 734, such as a radio transceiver operations control application, e.g., an application that is able to receive, process, generate, and transmit communications to enable a wireless computing device to control operations of a radio transceiver system. The memory 730 may include instructions 736 that are executable by the processor 720 to enable a wireless computing device to control operations of a radio transceiver system.

The processor 720 may also communicate with one or more storage devices 740. For example, the one or more storage devices 740 may include nonvolatile storage devices, such as magnetic disks, optical disks, or flash memory devices. The storage devices 740 may include both removable and non-removable memory devices. The storage devices 740 may be configured to store an operating system, applications, and program data. In a particular embodiment, the memory 730, the storage devices 740, or both, include tangible, non-transitory computer-readable media.

The processor 720 may also communicate with one or more input/output interfaces 750 that enable the computing device 710 to communicate with one or more input/output devices 770 to facilitate user interaction. The input/output interfaces 750 may include serial interfaces (e.g., universal serial bus (USB) interfaces or IEEE 1794 interfaces), parallel interfaces, display adapters, audio adapters, and other interfaces. The input/output devices 770 may include keyboards, pointing devices, displays, speakers, microphones, touch screens, and other devices. The processor 720 may detect interaction events based on user input received via the input/output interfaces 750. Additionally, the processor 720 may send a display to a display device via the input/output interfaces 750.

The processor 720 may communicate with other computer systems 780 via the one or more communications interfaces 760. The one or more communications interfaces 760 may include wired Ethernet interfaces, IEEE 802 wireless interfaces, Bluetooth communication interfaces, or other network interfaces. The other computer systems 780 may include host computers, servers, workstations, and other computing devices. For example, the one or more communications interfaces 760 may include the first interface 160 of FIG. 1, the second interface 162 of FIG. 1, the wireless interface 164 of FIG. 1, the wireless audio interface 166 of FIG. 1, a bus interface, or a combination thereof. As another example, the one or more communications interfaces 760 may include one or more interfaces of the controller 208, e.g., a wired interface, a wireless interface, a bus interface, or a combination thereof.

Thus, particular embodiments of a computer system enable a wireless computing device to control operations of a radio transceiver system. The instructions 736 may be executable to receive a command from a computing system, to send the command to the radio transceiver system, to receive an acknowledgement from the radio transceiver system responsive to the command, to send the acknowledgement to the computing system, to send a message indicating the acknowledgement via a wireless interface to a wireless computing device. Accordingly, the wireless computing device may be enabled to control operations of the radio transceiver system.

Embodiments described above illustrate but do not limit the disclosure. It is to be understood that numerous modifications and variations are possible in accordance with the principles of the present disclosure.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than is shown in the figures or one or more method steps may be omitted. Accordingly, the disclosure and the figures are to be regarded as illustrative rather than restrictive.

Moreover, although specific embodiments have been illustrated and described herein, it is to be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, the claimed subject matter may be directed to less than all of the features of any of the disclosed embodiments.

What is claimed is:

1. A device comprising:
   a first interface;
   a second interface;
   a wireless interface;
   a processor coupled to the first interface, the second interface, and the wireless interface; and
   a memory storing instructions that, when executed by the processor, cause the processor to perform operations comprising:

causing a command received from a computing system via the second interface to be sent to a radio transceiver system via the first interface;

causing an acknowledgement received from the radio transceiver system via the first interface to be sent to the computing system via the second interface, wherein the acknowledgement is responsive to the command; and causing a message indicating the acknowledgement to be sent to a wireless computing device via the wireless interface.

2. The device of claim 1, wherein the command includes at least one of a change frequency command, a change channel command, an adjust side tones command, an adjust feedback command, an adjust squelch command, an activate push-to-talk command, or a deactivate push-to-talk command.

3. The device of claim 1, wherein the wireless computing device includes at least one of a communications device, a personal digital assistant (PDA), a mobile location data unit, a mobile phone, a cellular phone, a computer, a portable computer, or a tablet computing device.

4. The device of claim 1, wherein the operations further comprise:

gathering synchronization data from the radio transceiver system, the synchronization data indicating settings of the radio transceiver system, and sending the synchronization data to the wireless computing device via the wireless interface.

5. The device of claim 4, wherein gathering the synchronization data includes emulating a startup process of the computing system.

6. The device of claim 5, wherein the startup process includes:

sending a status request message to the radio transceiver system, and receiving a first status message from the radio transceiver system, the first status message indicating the settings of the radio transceiver system.

7. The device of claim 1, wherein the operations further comprise initiating transmission of a simulated presence signal to the computing system during a time period in which data received from the first interface is not passed to the second interface and wherein the simulated presence signal indicates to the computing system that the radio transceiver system is coupled to the computing system.

8. The device of claim 1, wherein the wireless interface is compliant with an Institute of Electrical and Electronics Engineers (IEEE) 802.11 standard.

9. The device of claim 1, wherein the first interface is compliant with Electronic Industries Association (EIA) Recommended Standard 232 (RS-232) or EIA Recommended Standard 485 (RS-485).

10. A method comprising:

receiving, at a device, a command from a computing system;

sending the command from the device to a radio transceiver system;

receiving, at the device, an acknowledgement responsive to the command from the radio transceiver system;

sending the acknowledgement from the device to the computing system; and sending a message indicating the acknowledgement from the device to a wireless computing device via a wireless interface.

11. The method of claim 10, further comprising:

receiving, via a wireless audio interface, audio data using a first communication protocol from a headset; and sending the audio data using a second communication protocol to the radio transceiver system.

12. The method of claim 11, further comprising:

receiving second audio data using the second communication protocol from the radio transceiver system; and sending, via the wireless audio interface, the second audio data using the first communication protocol to the headset.

13. The method of claim 11, further comprising, before receiving the audio data:

receiving, via the wireless interface, a push-to-talk message from the wireless computing device; and activating the wireless audio interface in response to receiving the push-to-talk message.

14. The method of claim 11, further comprising, before receiving the audio data:

receiving, via the wireless interface, a push-to-talk message from the headset; and activating the wireless audio interface in response to receiving the push-to-talk message.

15. The method of claim 11, further comprising, before receiving the audio data:

receiving, via the wireless interface, a push-to-talk message from the wireless computing device; and sending, via a first interface coupled to the radio transceiver system, a push-to-talk command to the radio transceiver system in response to receiving the push-to-talk message.

16. A non-transitory computer-readable storage device storing instructions that, when executed by a processor, cause the processor to perform operations comprising:

receiving a command from a computing system;

sending the command to a radio transceiver system;

receiving an acknowledgement from the radio transceiver system responsive to the command;

sending the acknowledgement to the computing system; and sending, via a wireless interface, a message indicating the acknowledgement to a wireless computing device.

17. The non-transitory computer-readable storage device of claim 16, wherein the operations further comprise:

gathering synchronization data indicating settings of the radio transceiver system, and sending, via the wireless interface, the synchronization data to the wireless computing device.

18. The non-transitory computer-readable storage device of claim 16, wherein the operations further comprise:

receiving, via a wireless audio interface, audio data using a first communication protocol from a headset, sending the audio data using a second communication protocol to the radio transceiver system, receiving second audio data using the second communication protocol from the radio transceiver system, and sending, via the wireless audio interface, the second audio data using the first communication protocol to the headset.

19. The non-transitory computer-readable storage device of claim 18, wherein the operations further comprise, before receiving the audio data:

receiving a push-to-talk message from the headset;

in response to the push-to-talk message, activating the wireless audio interface; and sending a push-to-talk command to the radio transceiver system.

20. The non-transitory computer-readable storage device of claim 19, wherein the operations further comprise, before receiving the second audio data:

receiving a second push-to-talk message from the headset;
in response to the second push-to-talk message, deactivating the wireless audio interface; and
sending a second push-to-talk command to the radio transceiver system.

* * * * *